Nov. 20, 1934.  C. L. ORR  1,981,118
SIX WHEEL TRUCK
Filed Oct. 23, 1930   3 Sheets-Sheet 1
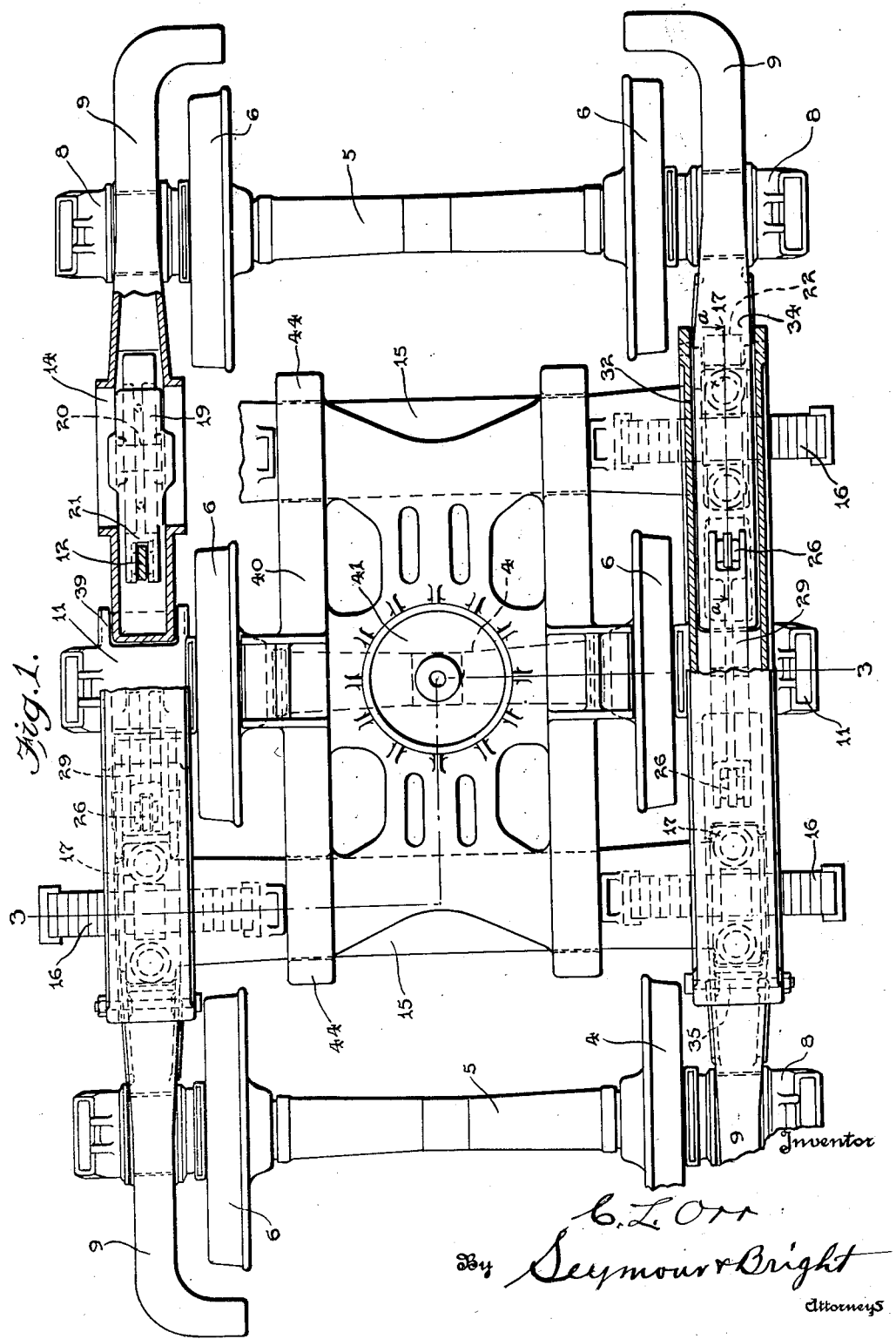

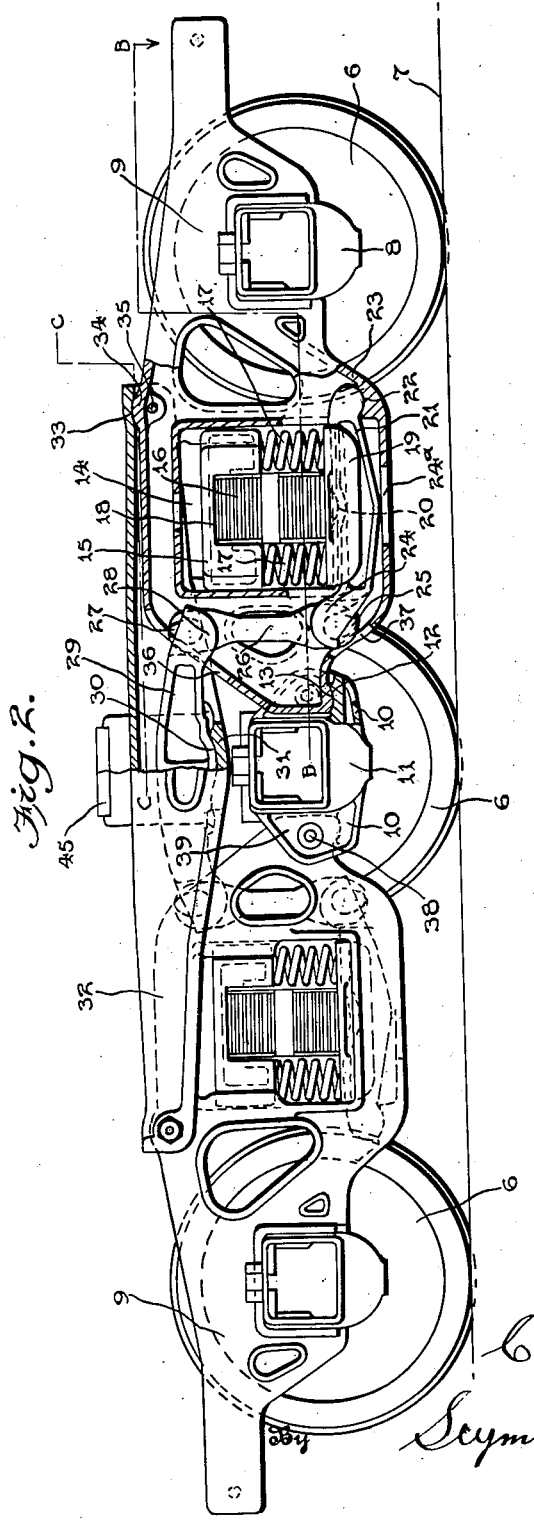

Nov. 20, 1934.  C. L. ORR  1,981,118
SIX WHEEL TRUCK
Filed Oct. 23, 1930  3 Sheets-Sheet 3
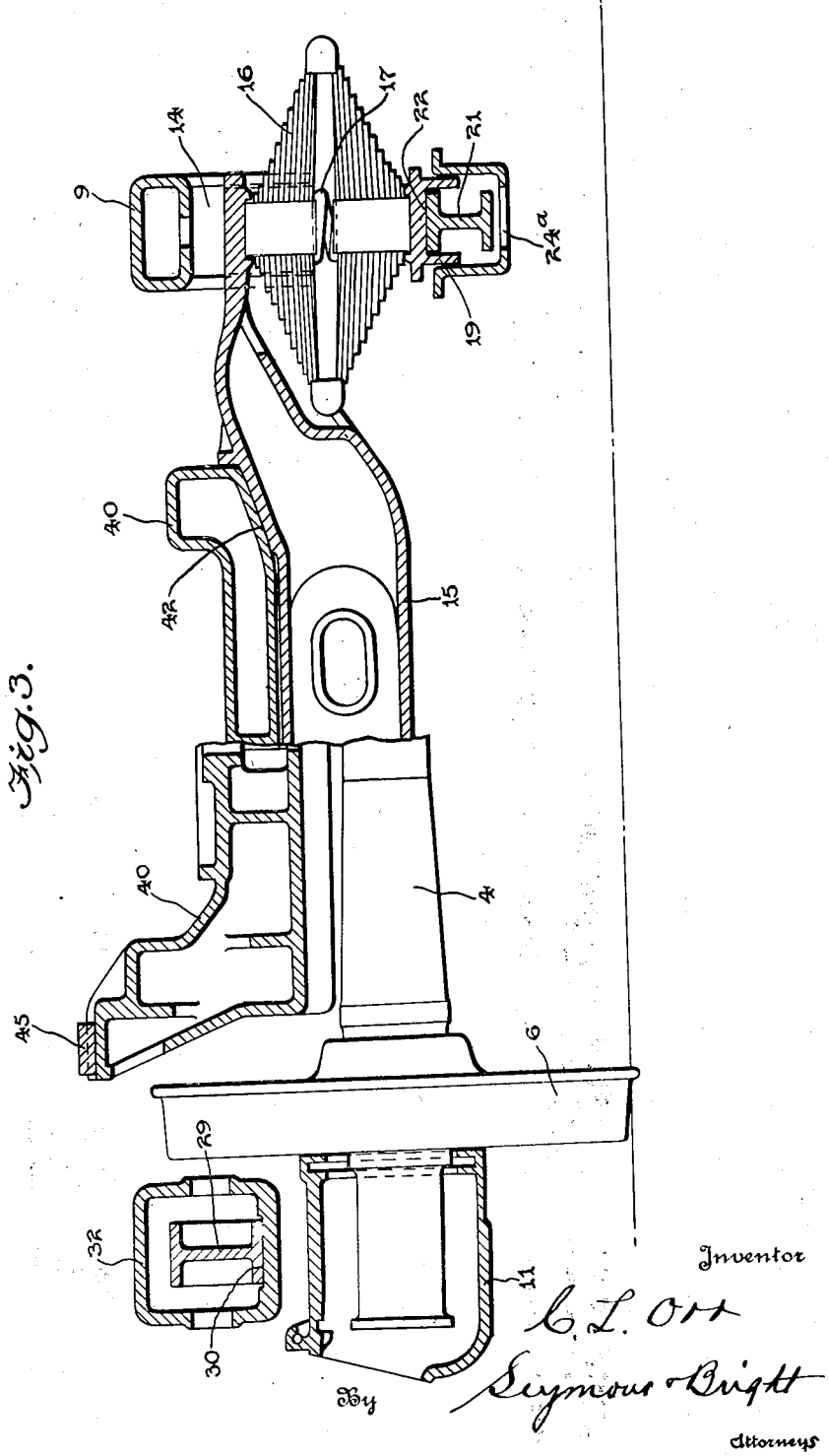

Patented Nov. 20, 1934

1,981,118

UNITED STATES PATENT OFFICE 1,981,118

SIX WHEEL TRUCK

Claude L. Orr, Columbus, Ohio, assignor to The Buckeye Steel Castings Company, Columbus, Ohio Application October 23, 1930, Serial No. 490,731

13 Claims. (Cl. 105—195)

This invention relates to improvements in car trucks, and more especially to a novel six-wheel truck.

A truck constructed in accordance with the present invention, has a different system of equalization than the standard six-wheel trucks used for many years, and the parts are so combined and arranged that elliptical, as well as helical springs can be used either in combination, as shown, or the spring groups can be composed entirely of one or the other types.

The main objects of the invention are; to provide a truck made up of parts which are of a size economical to produce in foundry or forage shops; to furnish a truck in which the transverse bolsters enter the side frame ensembles midway between the center lines of the adjacent axles, this both simplifying the transverse bolster design and rendering it easy to use elliptical springs, as well as helical, or a combination of the two types; and to provide a six-wheel truck in which the load on each side is equally distributed among the three axle journals and wheels, the equalization being independent of spring travel for ordinary track conditions.

Another object is to provide a truck of this type, so constructed that when the truck runs over uneven track, which puts the wheels and axles in different planes, an equalizing system forming part of the truck will function to maintain the planar relation of the various parts of the bolster system.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 shows at the left hand side, a top plan view of the improved truck, and the upper right hand portion of this view is a horizontal section on the line B—B of Fig. 2, while the lower right hand portion of the figure is a horizontal section on the line C—C of Fig. 2.

Fig. 2 is a side elevation of the truck partly in vertical section, the section being taken on the line A—A of Fig. 1.

Fig. 3 is a transverse vertical sectional view on the line 3—3 of Fig. 1.

In accordance with the present invention, the truck consists of a central axle 4 and end axles 5 which are connected to the wheels 6 running on tracks 7. There are three sets of these wheels, and the axles of the end wheels are journaled in boxes 8 which are grasped by the jaws of end members 9 of the side frames, there of course being a side frame at each side of the truck.

The inner end of each member 9 rests on a shelf 10. These shelves project forwardly and rearwardly from the journal box 11 of the center axle, and each shelf has a parti-cylindrical seat 12 which receives the complementary surface of a projection 13 arranged at the inner end of the member 9. Due to this construction, it is apparent that each end member may rock relatively to its seat 12.

A bolster opening 14 is provided in each end member, and the vertical axis of said opening is midway between the axes of the center axle, and one of the end axles, and transverse bolsters 15 have their ends projecting into these bolster openings. The bolsters rest upon spring groups in the bolster openings, and in the embodiment of the invention illustrated, each group comprises an elliptical spring 16, and a pair of helical springs 17. The elliptical spring extends transversely of the truck, and is accommodated by a recess 18 in the under side of the bolster, while the helical springs are arranged at opposite sides of the elliptical spring. The springs of each group rest upon a spring seat 19 that is positioned within the end member 9 and extends across the lower end of the bolster opening. Each spring seat has a parti-cylindrical projection 20 on its under side, which engages a complementary seat in the top of a rockable lever 21 which supports the spring seat. One end of the lever has a parti-cylindrical projection 22 which engages a complementary seat on the bottom portion 23 of the end member, and this bottom portion is cut away at 24ª to allow the lever to rock.

A hook 24 is positioned at the opposite end of the lever and has a rounded under surface that engages a complementary surface of a cross pin 25 that is supported by a suspended link 26. The upper end of the link has a similar pin 27 which may rock in the seat 28. There are two of these seats at the opposite ends of an equalizing beam 29, the intermediate portion of which is rockably supported at 30 by the cradle 31 of an intermediate frame 32. The ends of the intermediate frame have curved concaved surfaces 33 on their under sides to engage curved convex surfaces 34 projecting upwardly from the members 9. Bolts 35 pass through apertures in the members 9, and the ends of the intermediate frame for pivotally securing these parts together.

As the links 26 are arranged within the members 9, the inner end of each of said members is apertured at 36 and 37 to permit access to its interior, and to accommodate the parts which pass through or move within the same.

Provision is made at 38 for the introduction of bolts or pins through the flanges 39 of the center axle journal box, and the inner ends of the frame members 9, whereby in case the truck is lifted from the track, the center axle and journal box will be carried by the bolts or pins inserted at these points.

The transverse bolsters carry a main or central bolster 40 which has a center plate 41, and bears at its corners by inclined bearing surfaces 42 upon the transverse bolsters. Where the bearings are located, the central bolster has depending jaws 44 which extend downwardly along the sides of the transverse bolsters and act to tie the bolster ensemble together.

The main bolster also has side bearings 45 to take a portion of the load when the car sways.

It will be noted that each of the intermediate frames 32 is of inverted channel-shape, with the exception at its central portion, where the cradle 31 bridges the channel.

The load on the truck is applied to each of the four end frame members 9 at the bearing surfaces 22 and 33. This load is then distributed equally among the three journals on each side of the truck, because the center of the bearings 22 and 33 lie in the same vertical plane, and this plane is located with respect to the center line of the end axles 5, one-third the distance between the center of the end axle and the center of the bearing 12. By utilizing this principle of mechanics, if three units of load are applied at the bearing points 22 and 33 on one side frame, then two units would be supported by the end journal, and one unit by the bearing 12. The other end of the side frame system will act similarly, so that one unit of load will rest on each of the bearings 12, making two units for the center journal and two units for each of the end journals; thus the load is equally distributed. Both sides of the truck are, of course, similar.

It is not absolutely necessary to have the centers of the bearings 22 and 33 lie in the same vertical plane, providing the resultant of the loads of these two bearings lies in a vertical plane located in a certain place with respect to the end journal and bearing 12.

When the truck runs over uneven track, putting the wheels and axles in different planes, the equalizing system functions so as to maintain the planar relation of the various parts of the bolster system. This is accomplished by the equalizing beams 29 rocking on their cradles 31, and also by the center axle journal box 11 rotating about the center axle 4.

While I have disclosed what I now consider to be a preferred embodiment of the invention in such manner that the same may be readily understood by those skilled in the art, I am aware that changes may be made in the details disclosed, without departing from the spirit of the invention, as expressed in the claims.

What I claim and desire to secure by Letters Patent is:

1. A six-wheel car truck comprising a center axle and end axles, journal boxes on the axles, side frames mounted on the journal boxes, each side frame including a central member and end members, each end member resting partially on one of the end axle journal boxes, and at its other end on the central member, an intermediate frame pivotally connecting the end members, a rocking beam supported by the intermediate frame, transverse bolsters extending into the end members, and means including springs for partially supporting said bolsters by said beam.

2. A six-wheel truck comprising a center side frame member, end side frame members rockably engaging the center member, a central axle on which the center member is mounted, the end members being arranged in their entirety at opposite sides of said axle, an intermediate frame pivotally connecting the end members and extending over the center member, a rocking beam supported by the intermediate frame, transverse bolsters extending into said end members, means including rocking levers for supporting said bolsters, and means operatively connecting the rocking beam to said rocking levers.

3. A car truck comprising wheel supported side frames, each side frame including a center member and end members rockably engaged therewith, the center member having integral oppositely projecting bearing seats for directly supporting the end members from below, each end member having a bolster opening, a lever extending across the lower end of the bolster opening of each of said end members and having one of its ends rockably supported on the last mentioned member at one side of the opening, spring means carried by the levers, bolsters having ends extending into said openings and resting on said spring means, connecting means joining said end members, and means carried by the connecting means and including a rocking equalizing lever for supporting the opposite ends of the levers which extend across the lower end of the bolster openings.

4. In a car truck, a side frame comprising wheel supported end members, an intermediate frame having its ends rockably mounted on the end members, transverse bolsters extending into the end members, levers supporting said bolsters, each lever having one of its ends rockably mounted on one of the end members, and equalizing means supported by the intermediate frame and operatively connected to the opposite ends of the levers.

5. In a car truck, a side frame comprising wheel supported end members, an intermediate frame having its ends rockably mounted on the end members, transverse bolsters extending into the end members, levers supporting said bolsters, each lever having one of its ends rockably mounted on one of the end members, and equalizing means supported by the intermediate frame and operatively connected to the opposite ends of the levers, the point where the end of each lever rests on an end member being substantially in vertical alignment with the point where the same end member engages an end of the intermediate frame.

6. In a car truck, a side frame comprising wheel supported end members, an intermediate frame having its ends rockably mounted on the end members, transverse bolsters extending into the end members, levers supporting said bolsters, each lever having one of its ends rockably mounted on one of the end members, and equalizing means supported by the intermediate frame and operatively connected to the opposite ends of the levers, the equalizing means including a beam rockably supported by the intermediate frame.

7. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle, links having their upper ends supported by the beam, levers, each lever having one of its ends resting on an end member and its other end connected to the lower end of one of the links, a spring seat on each lever, spring means supported by each seat, transverse bolsters resting on the spring means, and a center bolster carried by the transverse bolsters.

8. In a six-wheel car truck, a center axle and end axles, wheels on the axles, side frames supported by the axles, each side frame comprising a center member and end members rockably engaging one another, an intermediate frame having its ends resting on the end member and provided with a cradle, an equalizing beam carried by the cradle, links having their upper ends supported by the beam, levers, each lever having one of its ends resting on an end member and its other end connected to the lower end of one of the links, a spring seat on each lever, spring means supported by each seat, transverse bolsters resting on the spring means, and a center bolster carried by the transverse bolsters, each end member and the intermediate frame having a rockable bearing at the point where the intermediate frame bears upon an end member.

9. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle, links having their upper ends supported by the beam, levers, each lever having one of its ends resting on an end member and its other end connected to the lower end of one of the links, a spring seat on each lever, spring means supported by each seat, transverse bolsters resting on the spring means, and a center bolster carried by the transverse bolsters, the surfaces of the intermediate frame and beam being curved where they contact, to provide a rockable support for the beam.

10. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle, links having their upper ends supported by the beam, levers, each lever having one of its ends resting on an end member and its other end connected to the lower end of one of the links, a spring seat on each lever, spring means supported by each seat, transverse bolsters resting on the spring means, and a center bolster carried by the transverse bolsters, each link being pivotally connected to an end of the equalizing beam.

11. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle, links having their upper ends supported by the beam, levers, each lever having one of its ends resting on and end member and its other end connected to the lower end of one of the links, a spring seat on each lever, spring means supported by each seat, transverse bolsters resting on the spring means, and a center bolster carried by the transverse bolsters, each lever being pivotally connected to one of said links.

12. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle; links having their upper ends supported by the beam, levers, each lever having one of its ends resting on an end member and its other end connected to the lower end of one of the links, a spring seat on each lever, spring means supported by each seat, transverse bolsters resting on the spring means, and a center bolster carried by the transverse bolsters, the end of each lever which rests upon an end member being curved to rock on said end member.

13. In a six-wheel car truck, a center axle and end axles, wheels on the axles, side frames supported by the axles, each side frame comprising a center member and end members rockably engaging one another, an intermediate frame having its ends resting on the end members and provided with a cradle, an equalizing beam carried by the cradle, links having their upper ends supported by the beam, levers, each lever having one of its ends resting on an end member, and its other end connected to the lower end of one of the links, a spring seat on each lever, spring means supported by each seat, transverse bolsters resting on the spring means, and a center bolster carried by the transverse bolsters, the surfaces of contact between the spring seat and each lever being rounded to allow the lever to rock relatively to the spring seat.

CLAUDE L. ORR.